United States Patent [19]

Spertini

[11] Patent Number: 5,266,604
[45] Date of Patent: Nov. 30, 1993

[54] PROCESS FOR MAKING FLEXIBLE FOAMS

[75] Inventor: Severino Spertini, Woluwe St. Pierre, Belgium

[73] Assignee: Imperial Chemical Industries PLC, London, England

[21] Appl. No.: 45,923

[22] Filed: Apr. 12, 1993

[30] Foreign Application Priority Data

Apr. 16, 1992 [GB] United Kingdom ............... 9208396

[51] Int. Cl.$^5$ .................................................. C08J 9/00
[52] U.S. Cl. ...................................... 521/129; 521/155
[58] Field of Search ........................................... 521/129

[56] References Cited

U.S. PATENT DOCUMENTS

| | | | |
|---|---|---|---|
| 3,149,083 | 9/1964 | Gmitter | 260/2.5 |
| 4,234,693 | 11/1980 | Wooler | 521/107 |
| 4,478,960 | 10/1984 | Buethe et al. | 521/160 |
| 4,786,704 | 11/1988 | Hughes et al. | 528/65 |
| 5,008,297 | 4/1991 | Maruyama et al. | 521/181 |
| 5,070,114 | 12/1991 | Watts et al. | 521/159 |
| 5,149,766 | 9/1992 | Bruchmann | 528/49 |

FOREIGN PATENT DOCUMENTS

| | | |
|---|---|---|
| 0671012 | 4/1966 | Belgium . |
| 2023148 | 3/1991 | Canada . |
| 0410467 | 1/1991 | European Pat. Off. . |
| 0442631 | 8/1991 | European Pat. Off. . |
| 0451826 | 10/1991 | European Pat. Off. . |
| 4161417 | of 0000 | Japan . |
| 2028354 | 3/1980 | United Kingdom . |

*Primary Examiner*—Morton Foelak

[57] ABSTRACT

Process for preparing a flexible polyurethane foam by reacting an isocyanate-containing prepolymer and an isocyanate-reactive composition comprising water in the presence of a dialkyl imidazole catalyst.

5 Claims, No Drawings

PROCESS FOR MAKING FLEXIBLE FOAMS

The present invention is concerned with a process for preparing a flexible polyurethane foam. Such processes are widely known.

In EP 392788 a process has been described to prepare a flexible polyurethane foam from a prepolymer and water. Although this process provides for fully water-blown foams of a good quality, the processing appeared to be rather cumbersome in view of the relatively high initial reactivity resulting in short end of rise times, especially for preparing foams of low density.

Surprisingly it has been found that by using a special catalyst the reactivity may be retarded giving a smooth rise profile and a longer end of rise time.

Therefore the present invention is concerned with a process for preparing a flexible polyurethane foam by reacting a liquid isocyanate-containing prepolymer composition having a free NCO content of from 2 to 15% by weight, as obtainable by reacting an isocyanate reactive polymer having an average nominal functionality of from 2 to 6 and a number average equivalent weight of from 500 to 5000 with a stoichiometric excess of a polyisocyanate composition, and an isocyanate-reactive composition comprising at least 50% by weight of water calculated on the total amount of isocyanate-reactive compounds in the presence of a catalytic amount of a 1,2-dialkyl-imidazole wherein the alkyl groups have 1-4 carbon atoms.

The term prepolymer in this context is defined as the reaction product of excess polyisocyanate and isocyanate-reactive polymer including unreacted polyisocyanate and polyisocyanate added after the reaction has been completed.

The use of these types of imidazoles as catalysts has been disclosed in general terms in EP 410467 and EP 451826. The catalysts disclosed are used for the reaction of a polyisocyanate and a polyol. Further it appeared that some of the catalysts disclosed therein which are structurally closely related to the ones used in the process according to the present invention are not useful as will be further clarified in the examples hereinafter.

UK 2028354 and Dutch Patent Application 76.06827 both disclose the use of imidazole catalysts in preparing polyurea foams from polyisocyanates and water. The polyisocyanates used are not of the prepolymer type according to the present invention.

The process according to the present invention preferably is conducted in the absence of chlorofluorocarbon blowing agents, like trichlorofluoromethane and more preferably in the absence of any physical blowing agent. For some applications water may be the only isocyanate-reactive ingredient which is used. For some other applications water may be used together with a chain extender having 2-6 isocyanate-reactive groups and having an average equivalent molecular weight of less than 500, preferably less than 250 and/or together with any of the polyols of higher molecular weight described hereinafter. The amount of chain extender together with higher molecular weight polyol in the isocyanate-reactive composition which is to be reacted with the prepolymer will not exceed the amount of water on a weight basis. Preferably 95% by weight of the isocyanate-reactive ingredients used is water.

The water, the chain extender and/or the higher molecular weight polyol may be combined prior to the reaction with the isocyanate prepolymer. The amount of this isocyanate-reactive composition generally is 1-20 and preferably 2-15 parts by weight per 100 parts by weight of prepolymer.

The imidazole catalyst may be selected from 1,2-dialkylimidazoles wherein the alkyl group has 1-4 carbon atoms. Both alkyl groups may be selected independently from each other from methyl, ethyl, propyl, isopropyl, butyl, isobutyl and tertiary butyl radicals; methyl and ethyl being the most preferred radicals. Examples of suitable compounds are 1,2-dimethyl-imidazole; 1,2-diethyl-imidazole; 1-methyl, 2-ethyl-imidazole; 1,2-dipropyl-imidazole and 1,2-dibutyl-imidazole. The catalyst generally is used in an amount of 0.1-5 and preferably 0.2-3% by weight calculated on the total weight of the isocyanate and isocyanate-reactive ingredients. The catalyst may be added to the isocyanate-reactive ingredients prior to the reaction. Addition to water prior to reaction is preferred.

The isocyanate prepolymers used in the process according to the present invention may be selected from those disclosed in EP 392788. Preferred isocyanate prepolymers are made from polymeric polyols and a stoichiometric excess of a diphenylmethane diisocyanate composition. Preferred polymeric polyols have an average nominal functionality of 2-3 and a number average equivalent weight of 1000–4000.

Mixtures of two or more isocyanate-reactive polymers varying in functionality, equivalent weight and/or chemical constitution (end groups or backbone) may be used provided such mixtures conform to the average functionality and average equivalent weight criteria specified herein.

Suitable polyols and methods for their preparation have been fully described in the prior art and, as examples of such polyols, there may be mentioned polyesters, polyesteramides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include polyoxypropylene diols and triols and poly(oxyethylene-oxypropylene) diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units may be mentioned. Mixtures of the said diols and triols can be particularly useful. Other particularly useful polyether polyols include polytetramethylene glycols obtained by the polymerisation of tetrahydrofuran.

A particularly interesting category of polyol components consists of polyether polyols having an average oxyethylene content of from 10 to 25% by weight of total oxyalkylene residues. In addition to the possibility of using mixtures of polyols varying in oxyethylene content, mixtures of two or more polyols varying in functionality, equivalent weight and/or polymer backbone may be used provided such mixtures conform to the average functionality and average equivalent weight criteria specified herein.

Polyester polyols which may be used include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxyethyl) terephthalate, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Suitable polyolefin polyols include hydroxy-terminated butadiene homo- and copolymers and suitable polysiloxane polyols include polydimethylsiloxane diols and triols.

Other polyols which may be used comprise dispersions or solutions of addition or condensation polymers in polyols of the types described above. Such modified polyols, often referred to as "polymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting for preparing isocyanate-containing prepolymers are products obtained by in situ polymerization of styrene and/or acrylonitrile in poly(oxyethylene/oxypropylene) polyols having functionalities of 2-3, equivalent weights of 1000-3000 and ethylene oxide contents of 5-50%, preferably 5-30% on a weight basis of total oxyalkylene residues, and products obtained by in situ reaction between a polyisocyanate and an amino or hydroxy-functional compound (such as triethanolamine) in a poly(oxyethylene/oxypropylene) polyol having a functionality of 2-3, and equivalent weight of 1000-3000 and an ethylene oxide content of 5-50%, preferably 5-30% on a weight basis of total oxyalkylene residues.

Polyoxyalkylene polyols containing from 5 to 50% of dispersed polymer are particularly useful. Particle sizes of the dispersed polymer of less than 50 microns are preferred.

Diphenylmethane diisocyanate compositions which may be used in the preparation of the prepolymer include unmodified diphenylmethane diisocyanates preferably containing at least 2% by weight of the 2,4'-isomer and preferably containing at least 55% by weight of the 4,4'-isomer. Suitable isocyanates therefore include isomer mixtures containing at least 2% but not more than 40%, preferably not more than 30%, and more preferably not more than 20%, by weight of the 2,4'-isomer and not more than 5% by weight of the 2,2'-isomer. Other suitable diphenylmethane diisocyanate compositions include modified forms of these diphenylmethane diisocyanates, that is to say MDI modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Diphenylmethane diisocyanate compositions containing MDI and polymeric fillers may also be used in the preparation of the prepolymer. Such products include polyurea dispersions in MDI as have been described in EP-A-0103 996. Other compositions containing polymeric fillers include prepolymers based on MDI and the above mentioned "polymer" polyols containing dispersed polymer particles. In these products, it is generally preferred that the dispersed polymer particles have an average particle size of less than 50 microns. Further diphenylmethane diisocyanate compositions which may be used in the preparation of the prepolymers include compositions containing polymethylene polyphenylene polyisocyanates. Thus, mixtures may be used containing at least 50% by weight of pure MDI and up to 50% by weight of the so-called polymeric MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the prepolymer include mixtures of the above described MDI types and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanates and m- and p-tetramethylxylene diisocyanates and, especially, aromatic polyisocyanates such as tolylene diisocyanates, phenylene diisocyanates and MDI compositions.

The isocyanate-terminated prepolymer may be prepared by reacting the diphenylmethane diisocyanate composition with the isocyanate-reactive polymer under conditions that have been fully described in the prior art for the preparation of prepolymers. Reaction temperatures of 40° C. to 90° C. are generally suitable for the preparation of urethane group-containing prepolymers from polyols or urea group-containing prepolymers from polyamines but, if desired, the reaction may be continued under known conditions so as to convert urethane groups to allophanate groups and urea groups to bioret groups. To achieve a final NCO content within the specified range, an initial ratio of isocyanate to isocyanate-reactive groups (for example NCO-/OH) would typically be within the range from 3:1 to 20:1. Prepolymers are made by reacting the starting materials at initial ratio of isocyanate to isocyanate-reactive groups in the range from 3.5:1 to 15:1, especially 4:1 to 10:1, to give prepolymers having NCO contents of 4 to 12%.

The isocyanate-terminated prepolymer compositions may further be blended with other polyisocyanate compositions, in particular further diphenylmethane diisocyanate compositions as mentioned for the preparation of the isocyanate-terminated prepolymer compositions provided the NCO content remains between 2 and 15% by weight.

To effect foam formation, the isocyanate-terminated prepolymer is reacted with water in the presence as necessary of conventional additives. Such additives include further catalysts, for example tertiary amines and tin compounds; surface-active agents and foam stabilisers, for example siloxane-oxyalkylene copolymers; chain extenders, for example low molecular weight diols, triols, diamines, triamines and di-imines for example ethylene glycol, glycerol, diethylene glycol, dipropylene glycol, diethyl toluene dismine and triethanolamine; flame retardants like melamine; organic and inorganic fillers, pigments and internal mould release agents. Moulded or slabstock foam may be prepared from the prepolymers using continuous, semi-continuous or discontinuous production techniques.

The foaming process generally is conducted at an isocyanate index of 35 to 125 and preferably of 45 to 105.

The invention is illustrated by the following Example in which all parts and percentages are by weight unless otherwise stated.

| Glossary | |
|---|---|
| Prepolymer: | a mixture of 86.6 parts by weight (pbw) of prepolymer A and 13.4 pbw of prepolymer B. Prepolymer A is the reaction product of a polyol having a functionality of 3, an ethylene oxide content of 14% by weight (tip) and a molecular weight of about 4500 and pure MDI having a 2,4' isomer content of 10% by weight, the prepolymer having an NCO content of 6.5% by weight. Prepolymer B is the reaction product of polymeric MDI (NCO content 30.7; functionality 2.7 and diisocyanate content 42% by weight) with 4% by weight of a polyol having a molecular weight of about 4000, a functionality of 3 and an ethylene oxide content of 75% by weight (randomly distributed); the NCO content of prepolymer B being 29.4% by weight. The NCO content of the Prepolymer as used in the present experiments is 9.6% by weight. |
| Catalyst 1 | Niax A1 obtainable from Union Carbide. |
| Catalyst 2 | D33 LV obtainable from Air Products. |
| Catalyst 3 | 1-methyl-imidazole, added as 80% by weight solution in water. |
| Catalyst 4 | Texocat ZF10 obtainable from Texaco. |
| Catalyst 5 | 1,2-dimethylimidazole, added as 80% by weight solution in water. |
| Catalyst 6 | 1,2-dimethylimidazole, added as 80% by weight solution in water/HCl, pH = 2. |

EXAMPLE 100 parts by weight of the Prepolymer was brought into contact with water in the presence of the catalyst and allowed to react; the total amount of water being 3.33 parts by weight.

The amount (in parts by weight) and type of catalyst used has been indicated in Table 1 together with some physical data.

TABLE 1

| Experiment | 1 | 2 | 3 | 4 | 5 |
|---|---|---|---|---|---|
| Catalyst | 1 + 2 | 3* | 4 | 5 | 6 |
| Amount | 0.25 + 0.25 | 0.9 | 0.4 | 0.5 | 0.5 |
| End of rise time, sec. | 85 | 160 | 100 | 135 | 160 |
| density, kg/m$^3$ | 36 | 33 | 36 | 37 | 38 |

*The foam obtained with this catalyst had an unacceptable smell.
Experiments 1, 2 and 3 are comparative.

I claim:

1. Process for preparing a flexible polyurethane foam by reacting a liquid isocyanate-containing prepolymer composition having a free NCO content of from 2 to 15% by weight, as obtainable by reacting an isocyanate reactive polymer having an average nominal functionality of from 2 to 6 and a number average equivalent weight of from 500 to 5000 with a stoichiometric excess of a polyisocyanate composition, and an isocyanate-reactive composition comprising at least 50% by weight of water calculated on the total amount of isocyanate-reactive compounds in the presence of a catalytic amount of a 1,2-dialkyl-imidazole wherein the alkyl groups have 1-4 carbon atoms.

2. Process according to claim 1 characterised in that the amount of isocyanate-reactive composition is 1-20 parts by weight per 100 parts by weight of prepolymer composition.

3. Process according to claim 1 characterised in that the amount of catalyst used is 0.1-5% by weight calculated on the total weight of the isocyanate and isocyanate-reactive ingredients.

4. Process according to claim 1 characterised in that the alkyl groups have 1 or 2 carbon atoms.

5. Process according to claim 1 characterised in that the amount of isocyanate-reactive composition is 1-20 parts by weight per 100 parts by weight of prepolymer composition and that the amount of catalyst used is 0.1-5% by weight calculated on the total weight of the isocyanate and isocyanate-reactive ingredients and that the alkyl groups have 1 or 2 carbon atoms.

* * * * *